Figure 1:
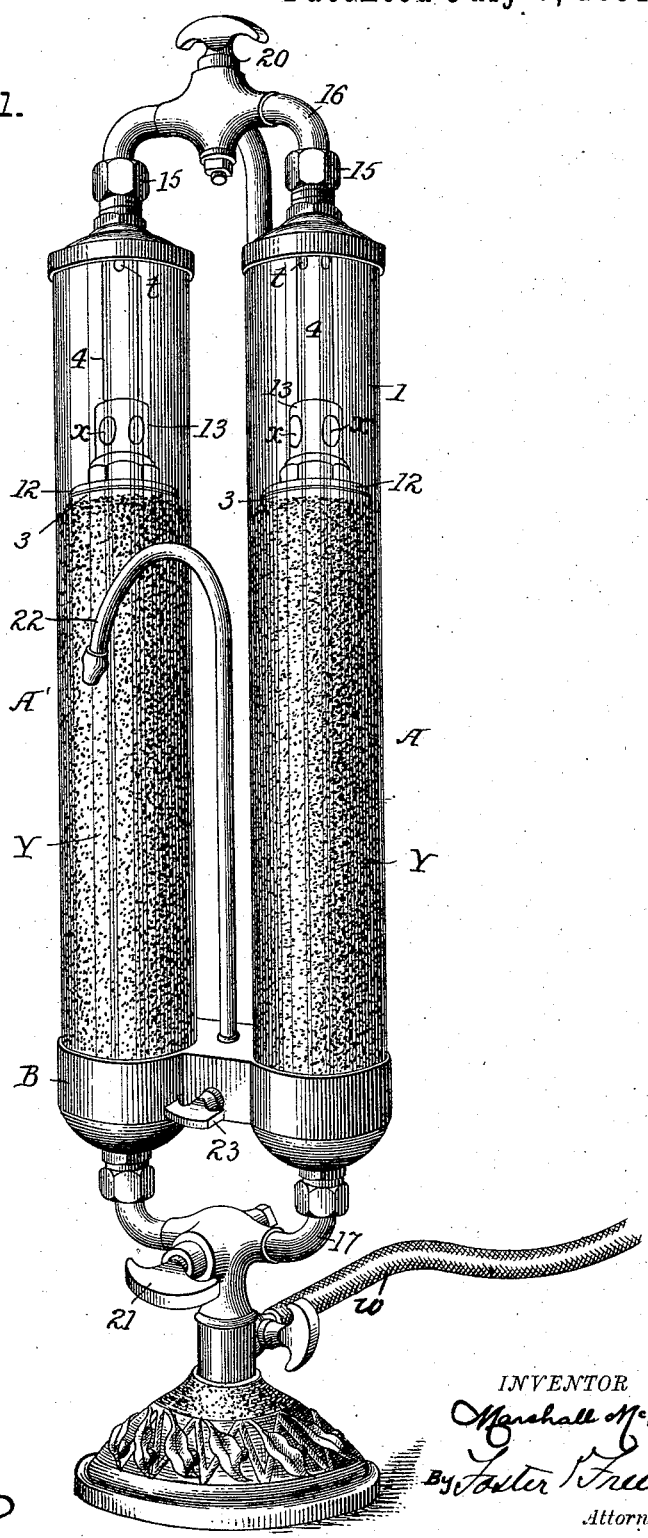

(No Model.) 3 Sheets—Sheet 1.

M. McDONALD.
METHOD OF AND MEANS FOR CLEANING FILTERING SURFACES.

No. 455,574. Patented July 7, 1891.

WITNESSES
INVENTOR
Marshall McDonald
By Foster Freeman
Attorneys (No Model.) 3 Sheets—Sheet 2.

M. McDONALD.
METHOD OF AND MEANS FOR CLEANING FILTERING SURFACES.

No. 455,574. Patented July 7, 1891.

WITNESSES
Jno. G. Hinkel.
H. S. McArthur.

INVENTOR
Marshall McDonald.
By Tatlir Freeman,
Attorneys.

(No Model.) 3 Sheets—Sheet 3.

M. McDONALD.
METHOD OF AND MEANS FOR CLEANING FILTERING SURFACES.

No. 455,574. Patented July 7, 1891.

WITNESSES
Jno. G. Hinkel
H. S. McArthur

INVENTOR
Marshall McDonald,
By Foster Freeman
Attorneys

UNITED STATES PATENT OFFICE.

MARSHALL McDONALD, OF WASHINGTON, DISTRICT OF COLUMBIA, ASSIGNOR TO THE AUTOMATIC FILTER COMPANY, OF SAME PLACE.

METHOD OF AND MEANS FOR CLEANING FILTERING-SURFACES.

SPECIFICATION forming part of Letters Patent No. 455,574, dated July 7, 1891.

Application filed January 8, 1891. Serial No. 377,089. (No model.) Patented in Canada January 13, 1891, No. 55,685.

*To all whom it may concern:*

Be it known that I, MARSHALL MCDONALD, a citizen of the United States, residing at Washington, in the District of Columbia, have invented certain new and useful Improvements in Methods of and Means for Cleaning Filtering-Surfaces, of which the following is a specification.

One of the most effective means for filtering water and other liquids consists in passing the same through a filtering medium composed of porous material, either natural or artificial, the water passing through the minute or capillary interstices, leaving upon the surface of the filtering medium the foreign elements and particles. A most serious objection to the use of such porous materials has been the clogging of the fine passages by impurities removed from the water, rendering it necessary to constantly withdraw the filtering plates, boxes, or cylinders from the filter-casing to subject the surface to the abrading action of the brush or other cleansing implement, and even in such case only the coarser particles that remain upon the surface of the filtering medium are removed, the finer particles which have lodged in the minute interstices of the said medium remaining to partially clog up the same. Another objection incident to the withdrawal of the filtering medium from its position in the filter is the liability of the said filtering medium to be broken in the cleansing operations, while the loosening of the packings and joints frequently results in permitting the unfiltered water to pass through the filter without being cleansed.

The object of my invention is to secure the advantages incident to the use of such filtering mediums, and to avoid the necessity of withdrawing the same from the filter-casing and unpacking the joints by automatically cleansing every portion of the filtering-surface as a result of drawing the water from the filter, and this I effect by causing a body of sand or other suitable comminuted gritty material to be solidly packed against and moved upon the filtering-surface, and also by reversing the preponderance of pressure at intervals upon opposite sides of the filtering medium, so that the pressure of the filtered water backward through said medium is made the cause of carrying the minute impurities outward, leaving the interstices free.

The casing and the arrangement and form of the filtering medium may be varied, as circumstances may require, and different means may be employed for packing the body of sand or its equivalent against the filtering-surface and causing its movement thereon and for varying the degree of pressure upon opposite sides of said medium; but I will now describe the constructions and arrangements of the parts in a duplex filter, illustrated in the accompanying drawings, in which—

Figure 2:
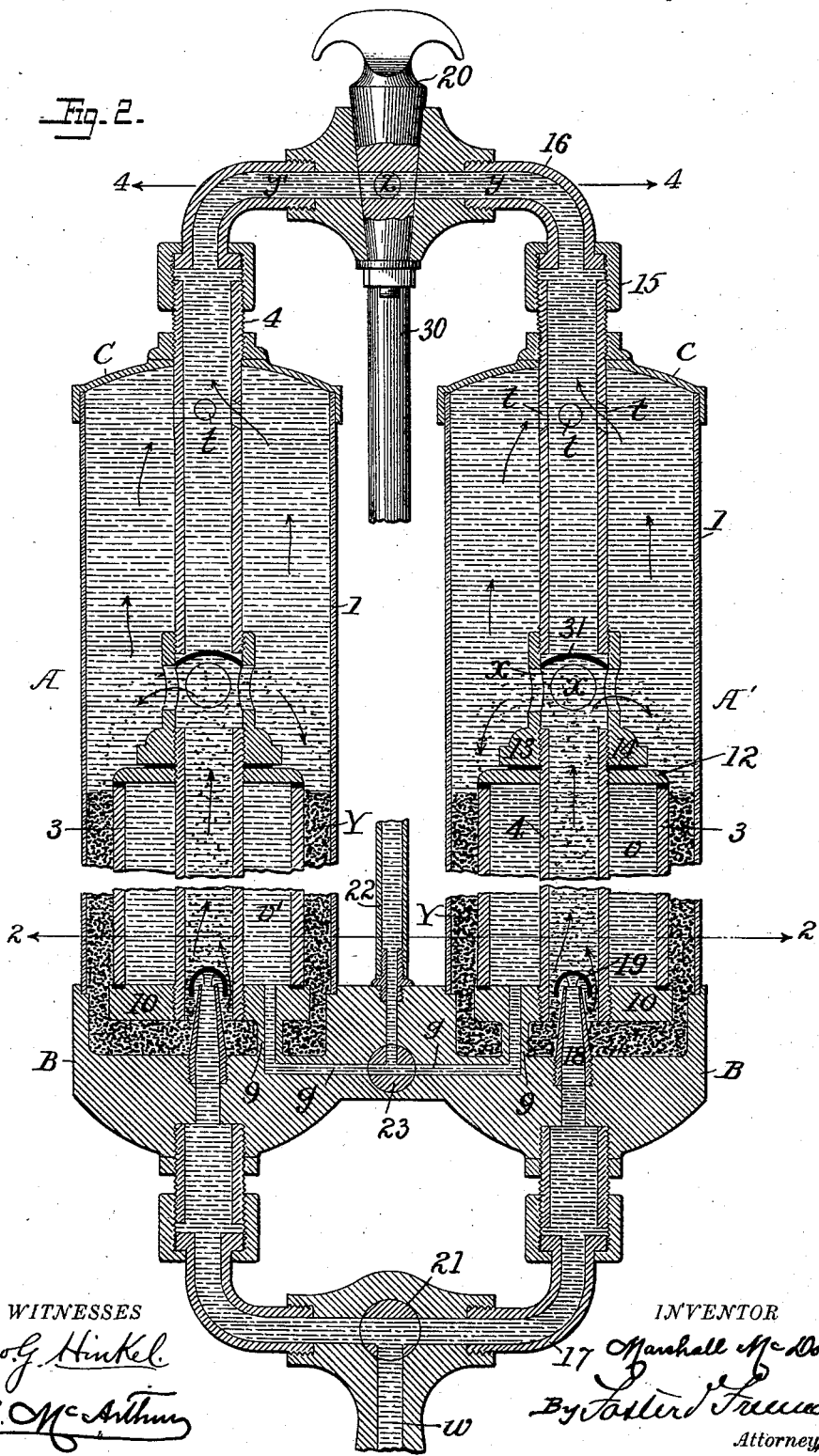
Figure 3:
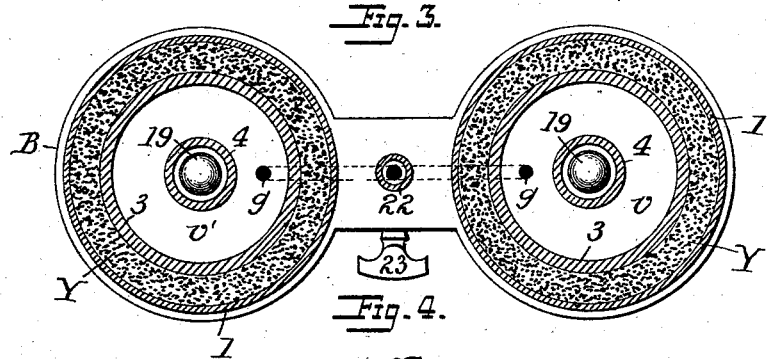
Figure 4:
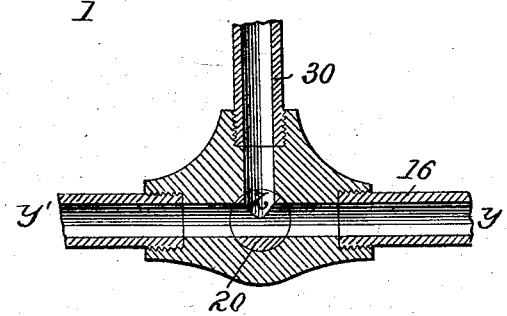
Figure 5:
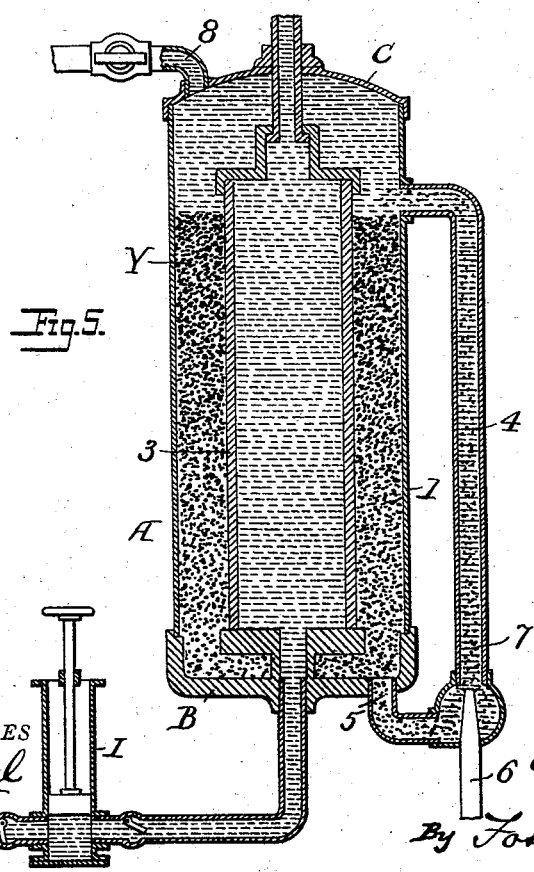

Figure 1 is an external elevation of the filter. Fig. 2 is a vertical section thereof. Fig. 3 is a transverse section on the line 2 2, Fig. 2. Fig. 4 is a section on the line 4 4, Fig. 2. Fig. 5 is a sectional view illustrating a modification.

In the apparatus shown in the drawings there are two filters A A', which, if desired, may be used independently, either one of said filters embodying some of the main features of my invention; but the two are shown in connection, as they may be made to co-operate to a more effectual result, and, if desired, the number assembled in one apparatus may be increased. Each filter has an external casing 1, preferably cylindrical and of glass, and confined between a bed-plate B and a cap-plate C, suitable packings or other means being used to prevent leakage at the joints. The filtering medium is in the form of a hollow cylinder 3, arranged within the casing 1, and to the said casing is admitted the water to be filtered, so that it will pass under pressure from the outside of the filtering-cylinder 3 to the inside of the cylinder to the chamber $v$, separating the impurities so that the clear water may be drawn from the interior.

Between the cylinder 3 and the casing 1 is a chamber in which is packed a body Y of sand, which rests solidly in contact with the filtering-face of the cylinder 3, so that upon withdrawing small portions of the sand successively from the bottom of the mass, the said body will move slowly downward with the particles in contact with each other and be packed against the entire outside of the cylinder with an abrading, rasping, or glacial action, which I have found in practice will most effectively remove the most adherent slimy deposits that can accumulate upon the surface.

While different means may be employed for withdrawing portions of the body of sand at the bottom of a mass, I prefer to cause the same to flow through one or more channels toward an upright channel or passage through which a current of water is directed upward, and thence into the casing above or near the top of the cylinder 3, whereby the said particles withdrawn from the bottom are carried upward and deposited upon the top of the mass, which constantly remains the same in volume while moving downward with a slow motion, and while the particles are successively subjected to the cleansing action of a stream of water. One mears of effecting this movement is illustrated in Fig. 5, in which a pipe or tube 4, external to the casing, communicates through a passage 5 with the bottom of the casing and extends to a point near the top of the cylinder 3, and an injector-tube 6 extends into the passage 7 in the tube 4. A tube 8 extends from the top of the casing to any suitable outlet—as, for instance, to the service-pipes of a dwelling, while the tube 6 communicates with the inlet-pipe of said dwelling, so that the water (or part thereof) used therein shall pass through the filter. When the passage through the tube 8 is opened, the water will flow upward through the nozzle 6 and channel 7, and through the casing 1 outward to the discharge-cock, and this current will carry with it the particles of sand which pass downward through the channel 5 until the force of the current is diminished in the wider space above the body of sand in the casing 1, when the particles will gradually descend upon the body of sand while the water will pass outward through the pipe 8, carrying with it the impurities washed from the sand. While the main body of the water is thus drawn through the filter in an unfiltered condition and serves during the time of its flow as a means of imparting motion to the body of sand and of washing and cleansing the sand and carrying away the impurities, the pressure in the casing 1, where the flow through the pipe 8 ceases, causes the water to flow through the porous filtering-cylinder 3 into the interior, from which it may be withdrawn from time to time, as desired.

While the channel 7 may be outside of the casing 1, or while it may be within said casing surrounded by a group of cylinders, as set forth in my application for Letters Patent, Serial No. 352,573, I prefer in some instances to arrange the water-channel 7 within the filtering-cylinder—as, for instance, by arranging the pipe 4 within the said cylinder, as shown in Figs. 1, 2, and 3. In this construction the bed-plate B is provided with standards 9, supporting a ring 10, which in turn supports the cylinder 3 and pipe 4, and serves to close the space between their lower ends, while a cap 12, encircling the upper end of the tube 4, rests upon the upper end of the cylinder with a packing between, and a nut 13 screws upon the outside of the pipe against the packing 14, sealing the joint between the cap and the pipe.

In the pipe 4 above the nut 13 are openings $x$, and said pipe then passes through the cap-plate C and receives a screw-ring 15, which serves to connect it with an outlet-pipe 16, preferably in the form of a yoke-pipe connecting the pipes 4 of the two filters. An inlet-pipe 17, also preferably in the form of a yoke-pipe and communicating with both filters, communicates in each filter with a nozzle 18, extending upward concentric with the pipe 4 into the ring 10, where it is provided with a deflector-cap 19, so arranged as to deflect the current of incoming water downward.

A three-way cock 20 in the pipe 16 serves as a means of putting the two outlet-channels $y\ y'$ thereof in communication with each other and with the discharge-channel $z$, with which may communicate a pipe 30, leading to the house or any suitable receptacle for the unfiltered water; or said cock may serve as a means of cutting off the communication with the passage $z$ and one or both of the filters. Another three-way cock 21 in the pipe 17 serves as a means of putting the inlet-channel $w$ in communication with one or both of the filters or of cutting off the communication entirely. The chamber $v$ of each filter is in communication through a channel $g$ with an outlet-pipe 22, leading to any suitable cock or reservoir, and a three-way cock 23 serves as a means of putting both channels $g$ in communication with the pipe 22 or of cutting off the communication with one or both of said channels. The space in the casing 1 around the cylinder 3 is packed with a body of sand, which flows also into the space around the nozzle 18. When the parts are in the position shown in Fig. 2, the inlet water passes upward through the nozzle 18 and is thence deflected downward, thereby creating a current which laps or cuts into the sand that passes downward around the ring 10 to the space below the latter, so that as the current then ascends it will carry with it particles of the sand upward through the tube 4, and thence against a deflector-plate 31, and outward through the openings $x$, when the said particles will fall onto the body of sand below, while the water will pass through openings $t\ t$ into the discharge-pipe 16, the body of sand moving downward and cleaning the filtering-surface. When the water pursues the same course through both filters, the above-described operation will be the same in each, and when the outlet-passages are closed the pressure of the water in each filter will cause it to pass through the cylinder 3, by which the impurities are removed, the body of sand in the first instance acting as a preliminary straining medium to remove the coarser particles.

Different means may be employed for causing occasionally a preponderance of pressure on the filtered side of the filtering medium such as will cause the filtered water to flow outward through the filtering medium at intervals to expel the impurities that have accumulated in the smaller interstices, from which they cannot be removed by the abrading action of the sand; but in the construction above described the desired result may be effected by manipulating the cocks so as to secure the pressure of the water to expel the impurities outward. Thus supposing that the cock 20 is turned so as to draw the outflowing current only from the left through the channel $y'$, there will be but little pressure from the outside inward through the cylinder 3 of the left-hand filter, through which the unfiltered water is passing freely, and in which the body of sand is operating to cleanse the filtering-surface, while the pressure in the right-hand filter will be that of the whole head of water passing inward from the casing 1, through the cylinder 3, and from the space $v$ between the cylinder 3 and pipe 4, and through the passage $g$ into the space $v'$ behind the filtering-cylinder 3 of the left-hand filter, and thence outward, through the filtering medium of the left-hand filter during the cleansing action of the sand, this outflowing current acting to effectively remove from said filtering medium all the particles within the body of the same that obstructs its filtering action. When the opposite filter is to be cleansed, it is only necessary to turn the cock 20 to open the passage $y$ and close the passage $y'$.

It will be obvious that other means may be employed for creating the back-pressure either during the time the sand is acting to cleanse the filtering-surface or at other times. For instance, in the construction shown in Fig. 5 a hand-pump I, with suitable valves, may be used to secure the desired inside pressure from time to time.

In the Letters Patent No. 381,401, granted to me April 17, 1888, I have described a filter in which a body of sand is caused to move upon the surface of a filtering medium; but in the construction therein described only a portion of the filtering-surface is subjected to the action of the sand, another portion of said surface being exposed to the upflowing current of water carrying particles of sand separated from each other, in which condition they will not act as they will in a solid mass, so that in such case a portion of the filtering-surface speedily becomes coated and inoperative; but in the construction above described the entire filtering-surface is thoroughly abraded in such manner that every particle of the most adherent coating is speedily removed, as are those finer particles that penetrate the body of the filtering medium.

In the filter described in my aforesaid patent the nozzle for the inflowing currents were arranged with their upper ends below the point to which the sand descended, whereby upon the ceasing of the flow there was danger of sand finding its way into said nozzles. In the above-described apparatus this is avoided by extending the nozzles above the point to which the sand passes from the sand-chamber, while by the use of the downwardly-extending reflector causing the current to lap the body of sand in the receptacle and very much better elevating effect is secured.

Without limiting myself to the precise construction and arrangement of parts shown and described, I claim—

1. The within-described improvement in the method of cleansing the surface of filtering mediums, the same consisting in maintaining a body of sand in contact with the entire filtering-surface and moving it at intervals as a solid body over said surface, substantially as set forth.

2. The within-described improvement in the method of cleansing the surface of filtering mediums, consisting in maintaining a body of sand with the water to be filtered against the filtering-surface, and withdrawing particles of sand at intervals from the said body at one end and carrying them away from the filtering-surface to the opposite end, thereby moving the entire body as a solid mass against the filtering-surface, substantially as set forth.

3. The within-described improvement in the method of cleansing filtering mediums, the same consisting in subjecting the outside of said medium to the action of an abrading material and simultaneously increasing the internal pressure, substantially as set forth.

4. The within-described improvement in the method of cleansing filtering mediums, the same consisting in acting upon the outer surface of the filtering medium to cleanse the same while maintaining a superior pressure upon the opposite side, substantially as set forth.

5. The combination, in a filter, of a filtering medium separating the receptacles for the unfiltered and filtered water, a body of sand lying in contact with the filtering-surface, and means for moving said body as a mass over the entire filtering-surface, substantially as described.

6. The combination, in a filter, of receptacles for filtered and unfiltered water separated by a filtering medium, a body of sand in the unfiltered-water receptacle lying in contact with the filtering-surface, a water-channel extending from below to the top of said body, and means for creating an upward-circulating current through said channel to convey the particles of sand from the bottom to the top of the body away from contact with the filtering-surface, substantially as set forth.

7. The combination, in a filter, of chambers separated by a filtering medium, a body of sand lying against the filtering-surface in one of the chambers, and an independent channel communicating with the top and bottom of the sand-chamber, and a nozzle for directing a current of water upward through said channel, substantially as set forth.

8. The combination, with the casing, filtering medium, and body of sand in contact with the filtering-surface, of an independent channel for the passage of the upward current of the water and a nozzle below said channel, substantially as set forth.

9. The combination of a casing, cylindrical filtering medium surrounding body of sand, and a vertical channel within the filtering medium and the nozzle below said channel, substantially as set forth.

10. The combination, with the filtering medium surrounding body of sand, channel, and means for elevating successive portions of the sand with water through the channel, of a deflector above the channel, substantially as set forth.

11. The combination, with the filtering-cylinder 3, tube 4, and intermediate receptacle for the filtered water, of a surrounding casing with a body of sand between the casing and the cylinder, a passage leading from the sand-chamber to a receptacle below the tube 4, and a nozzle below the tube, substantially as set forth.

12. The combination of the casing, filtering medium, sand-chamber, and independent channel for elevating with the sand communicating with the sand-chamber above and below the filtering medium, substantially as set forth.

13. The combination, with the casing, filtering-cylinder, and tube 4, of a ring supporting the said cylinder and tube and an inlet-nozzle below said tube, substantially as set forth.

14. The combination, with the casing, filtering medium, sand-chamber, and vertical water-channel, of a nozzle projecting upward above the bottom of the casing below said channel and a receptacle surrounding the nozzle for the admission of sand, substantially as set forth.

15. The combination, with the casing, filtering medium, sand-chamber, water-channel, and nozzle projecting into the chamber, of a deflector above said nozzle, for the purpose set forth.

16. The combination, with the casing, filtering-cylinder, filtering medium, and independent water-channel within the cylinder, of a nozzle below the water-channel, substantially as set forth.

17. The combination of the casing, filtering medium, chamber for the filtered water, sand-chamber, and means for moving a body of sand over the filtering-surface of an outlet for unfiltered water, and a second chamber containing filtered water under pressure, communicating with the filtered-water chamber of the filter, substantially as set forth.

18. The combination, with the filtering medium, means for cleansing the filtering-surface of the latter, and filtered-water chamber of a filter, of a second water-chamber communicating with the first and containing filtered water under pressure, for the purpose set forth.

19. The combination of two filters, each having a filtering medium, a body of sand surrounding the same, and means for taking particles of sand from the bottom and depositing them on the top of said body, and channels and cocks arranged to conduct the filtered water under pressure from one filter into the chamber of the other when the sand is moving over the surface of the latter, substantially as described.

20. The combination of two filters, each having a filtering medium, with a filtered-water chamber upon one side, a body of sand upon the other, and means for moving the sand to cleanse the filtering-surface, and a communication between the two chambers, and means for drawing the unfiltered water independently from the two filters, substantially as set forth.

In testimony whereof I have signed my name to this specification in the presence of two subscribing witnesses.

MARSHALL McDONALD.

Witnesses:
J. S. BARKER,
G. P. KRAMER.